United States Patent
Schiesser

[11] 3,856,447
[45] Dec. 24, 1974

[54] EXTRUSION HEAD FOR THE MANUFACTURE OF HOSES FORMED OF PLASTIC MASSES AND CONTAINING REINFORCEMENT INSERTS

[75] Inventor: Walter Hugo Schiesser, Zurich, Switzerland

[73] Assignee: Schiesser AG, Zurich, Switzerland

[22] Filed: June 26, 1973

[21] Appl. No.: 373,651

Related U.S. Application Data

[62] Division of Ser. No. 151,418, June 9, 1971.

[30] Foreign Application Priority Data
June 16, 1970 Switzerland.................. 9100/70

[52] U.S. Cl.............. 425/114, 264/174, 425/133, 425/380, 425/461
[51] Int. Cl............................................. B29f 3/10
[58] Field of Search .......... 425/113, 114, 131, 133, 425/461, 462, 467, 464, 376, 380; 264/173, 174; 156/244

[56] References Cited
UNITED STATES PATENTS

| | | | |
|---|---|---|---|
| 3,520,966 | 7/1970 | Soffiantini | 264/173 |
| 3,694,131 | 9/1972 | Stuart | 425/113 X |
| 3,697,209 | 10/1972 | Schiesser | 425/114 X |
| 3,773,449 | 11/1973 | Hager | 425/114 |

Primary Examiner—R. Spencer Annear
Assistant Examiner—Mark Rosenbaum
Attorney, Agent, or Firm—Edward J. Brenner

[57] ABSTRACT

Apparatus for the fabrication of hoses formed of rubber or other plastic masses and containing reinforcement inserts, wherein the reinforcement material is continuously conveyed to a hose forming location in a position which this reinforcement material is later to assume at the hose. Then, for the purpose of forming the hose, plastic mass is simultaneously injected at this location from the inside and the outside against the reinforcement material, the thus formed unit is then calibrated and continuously withdrawn.

9 Claims, 4 Drawing Figures

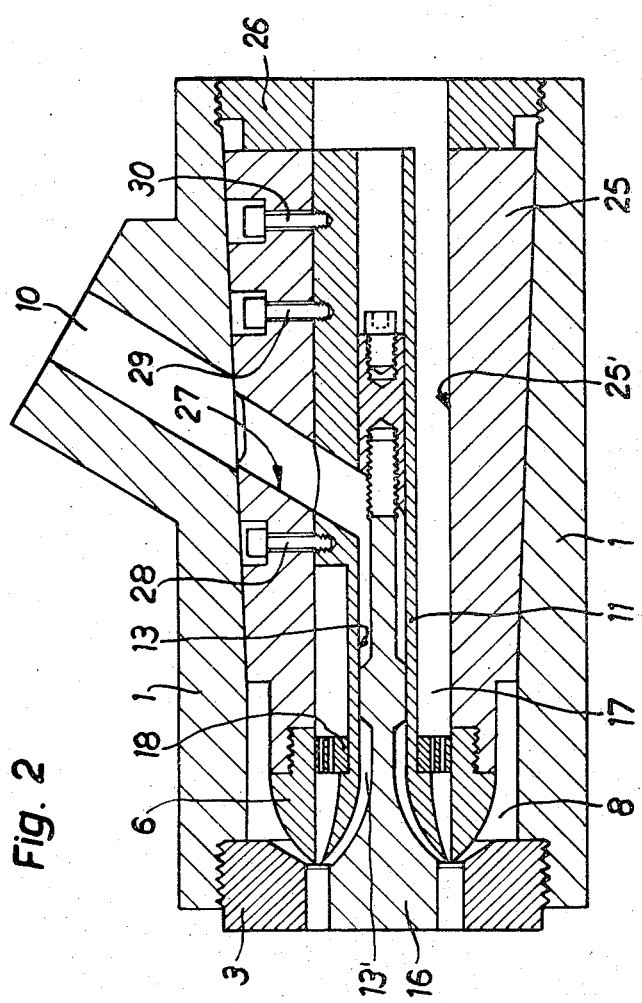
Fig. 2
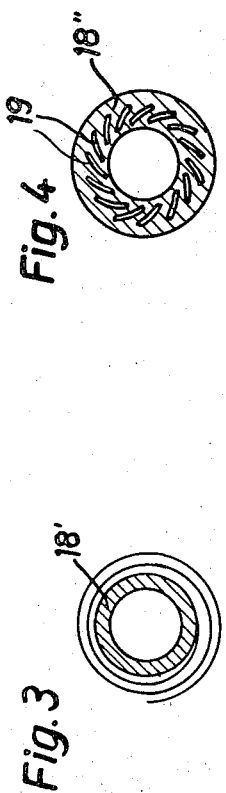
Fig. 3
Fig. 4

3,856,447

EXTRUSION HEAD FOR THE MANUFACTURE OF HOSES FORMED OF PLASTIC MASSES AND CONTAINING REINFORCEMENT INSERTS

CROSS REFERENCE TO RELATED APPLICATION

This application is a division of my copending application, Ser. No. 151,418, filed June 9, 1971.

BACKGROUND OF THE INVENTION

The present invention relates to a new and improved apparatus for the fabrication of hoses or hose-like members formed of rubber or other plastic masses, these hoses possessing reinforcement inserts at the wall of the hose material for the purpose of reinforcing such hoses against the action of external forces, for instance internal pressure, and this invention also relates to a new and improved injection head useful in the performance of the inventive method.

Hoses containing such reinforcement inserts, especially fabric-reinforced hoses, are presently manufactured in accordance with a number of different conventional techniques. However, the heretofore known prior art techniques for the fabrication of such hoses require cumbersome, complicated and expensive finishing operations, and in part a large amount of packaging work. Furthermore, in this regard suitably constructed and designed mechanical devices are required. A primary feature which is present in conventional finishing techniques is that initially there must be molded a so-called core serving as the hose and over which in a subsequent working operation and with the aid of special equipment there is applied a reinforcement formed of a fabric band or fabric fibers (bands with the aid of a band machine, lace bobbin with the aid of a bobbin lace machine or knitting machine). Thereafter, during a second throughpassage through a transverse injection head the outer hose is molded thereon by extrusion molding techniques. This procedure repeats depending upon the number of fabric reinforcements which are desired to be provided at the wall of the hose. Furthermore, it is generally also required with this technique to draw the inner hose, the core, onto a long mandrel, prior to throughpassage of such inner hose through the machine which places thereon the fabric reinforcements.

It should be evident from what has been discussed above that this manufacturing technique which is composed of a number of different working operations constitutes a cumbersome process and is also correspondingly expensive.

Now in Swiss Pat. 490,958 of the assignee of this application there is described a method enabling the production in a single working operation of hoses formed of rubber or other plastic masses and which contain reinforcement inserts, and wherein also there can be carried out a subsequent vulcanization with a continuous throughpassage-vulcanizing technique (for instance salt bath, high frequency vulcanization furnace, and so forth).

This known manufacturing method resides in the features that there is continuously molded a first, inner layer of the hose wall, that upon the periphery of the thus forming wall portion which is in a plastic condition there is applied reinforcement material in a manner so that it can be entrained in the lengthwise direction of the hose, and the entire unit then has molded thereabout at least one further layer of a plastic mass.

SUMMARY OF THE INVENTION

It is a primary objective of this invention to improve upon the aforementioned method disclosed in the aforementioned Swiss Patent.

Another and more specific object of the present invention relates to an improved method for manufacturing hoses equipped with reinforcement inserts in a relatively simple, economical and uncomplicated fashion and which overcomes the aforementioned drawbacks associated with the prior art manufacturing techniques.

Another and further object of this invention relates to an improved method of manufacturing hoses formed of plastic masses and containing reinforcement inserts in an extremely simple, economical and rational fashion and not requiring complicated operating procedures as well as complicated and expensive manufacturing equipment.

Still a further significant object of the present invention relates to improved constructions of injection heads which can be used in the inventive manufacturing method.

Now, in order to implement these and still further objects of the invention which will become more readily apparent as the description proceeds, the method aspects of this invention are generally manifested by the features that reinforcement material is continuously brought to a hose forming location and in a position which this reinforcement material is to assume later on at the hose. At this location and for the purpose of forming the hose, plastic material is simultaneously injection molded from the inside and the outside against the reinforcement material, the entire unit thus formed is calibrated and continuously withdrawn. The reinforcement material can be brought to the hose forming location, for instance in the form of a spiral- or helical-wound band.

It will further be recalled that a further aspect of this invention relates to a new and improved construction of injection head, particularly suitable for carrying out the inventive method. The injection head of this development is generally manifested by the features that such contains two compartments communicating with an inlet for plasticized mass for forming the hose. At the outlet of the injection head there is arranged an extrusion die possessing a substantially ring-shaped or annular injection or extrusion opening. Each of the aforementioned compartments possesses an outlet with a substantially ring-shaped discharge or outlet opening, these openings being arranged concentrically with respect to one another and opening in front of the inlet of the aforementioned injection or extrusion opening. Further, there is provided an outlet which likewise opens into the injection or extrusion opening and is arranged concentrically between the aforementioned discharge openings of the compartments, and guide means are also provided for the reinforcement material which is introduced into the injection head in order to guide such material in a predetermined spatial position or orientation through the outlet into the injection opening.

A particularly advantageous construction of the inventive injection head is obtained through the provision of a housing having a continuous bore therein and at least one lateral inlet for the plasticized mass. Further, this construction contemplates having an injection disk with an injection or extrusion opening mounted at the front end of the bore of the housing, a first bushing or sleeve is arranged internally of the housing bore, the front end of this bushing or sleeve forming a distributor head and extending at least up to the region of the injection or extrusion opening, and wherein between the distributor head and the wall of the housing bore there is present a compartment which communicates with the inlet for the mass of material forming the hose. Additionally, there is provided a second bushing or sleeve arranged within the first bushing and at a spacing therefrom, the front end of this second bushing likewise extending at least up to the region of the injection or extrusion opening and the bore thereof being closed towards the rear end. Further, a mandrel which likewise is in communication with the inlet for the hose forming mass is arranged internally of the bore of the second bushing or sleeve, and a portion thereof extends out of such second bushing and through the injection opening. Guide means are provided in the annular compartment between the first and the second bushings, and these guide means serve for guiding the reinforcement material introduced into the injection head in order to guide such material in a predetermined spatial arrangement or position out of the annular gap between the front end of the distributor head and the second bushing into the annular compartment between the mandrel and the injection disk.

By means of the inventive method it is possible to fabricate hose members or hose-like elements reinforced with textile or other reinforcement materials, for instance with fabric or netting. There can be used both "open" as well as "closed" fabric or netting, it is to be understood that an "open" fabric or netting is one where the mesh size or width is large enough in order to permit passage of plastic hose forming material, whereas such is not the case with a "closed" fabric or netting. Naturally, where required the reinforcement material can be prepared with a suitable binder.

BRIEF DESCRIPTION OF THE DRAWINGS

The invention will be better understood and objects other than those set forth above will become apparent when consideration is given to the following detailed description thereof. Such description makes reference to the annexed drawings showing a number of embodiments of inventive injection head useful in the practice of the method aspects of this development, wherein generally the same reference characters have been used throughout the various Figures for denoting the same or analogous components, and wherein:

FIG. 2 is a similar longitudinal sectional view of a second embodiment of inventive injection head; and FIGS. 3 and 4 are cross-sectional views of two respective constructional forms of guide element for the reinforcement material.

DETAILED DESCRIPTION OF THE PREFERRED EMBODIMENTS

Figure 1:
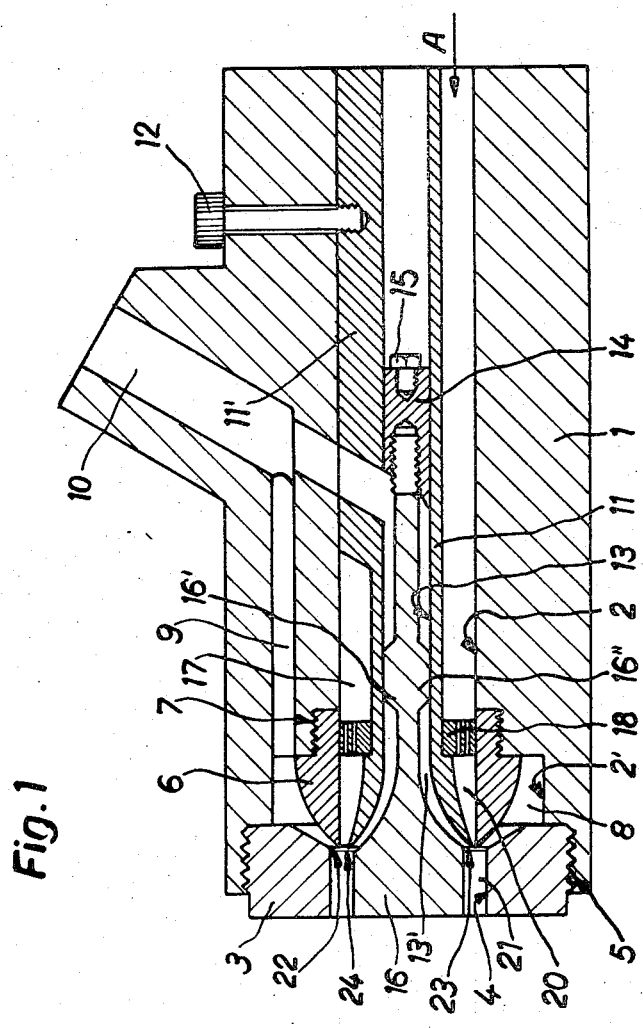
FIG. 1 is a schematic longitudinal sectional view through a first embodiment of inventive injection head useful in the practice of the method of this invention.

Describing now the drawings and turning attention specifically initially to the showing of FIG. 1 there is depicted therein a longitudinal sectional view of one form of inventive injection head device for the fabrication of hose members or hose-like elements, hereinafter conveniently simply referred to as hoses, formed of rubber or another type of suitable plastic mass as is well known in this art, and containing reinforcement inserts. The depicted injection head device essentially embodies a housing 1 having a continuous lengthwise or longitudinal bore 2. At the front end of the housing bore 2 there is mounted and fixedly retained in any suitable way an injection or extrusion disk 3 having a central bore 4. Fixing of the injection disk 3 can be accomplished by threading such into threading 5 provided at the housing 1 by way of example. At the front region of the housing bore 2 there is arranged a distributor head 6, and here also distributor head 6 can be attached for instance by threading such into threading 7, here likewise shown as provided at the housing 1.

Now, it will be observed that between the distributor head 6, the injection or extrusion disk 3 and a section 2' of the housing bore 2, shown as a stepped portion, there is formed a compartment or chamber 8 which is in flow communication through the agency of one or a number of channels 9 with a lateral inlet 10 of the housing 1, whereby compartment 8 can be supplied with plasticized material serving to form the hose. Further, a bushing or sleeve member 11 is mounted within the longitudinal bore 2 of the housing and at least at the front region of the housing 1 this bushing 11 is spaced at all sides from the inner wall of the bore 2, as shown. Further, the bushing or sleeve 11 extends with its front end coaxially through the distributor head 6 and is fixedly retained in the housing 1 by suitable fastening means, for instance screws 12, only one of which has been shown in FIG. 1, these screws 12 extending through the wall of the housing 1 and threadably engaging with a locally enlarged section or portion 11' of the bushing 11. It will be observed that the bushing or sleeve 11 is similarly provided with a lengthwise extended bore 13 which likewise is in flow communication with the inlet 10 for the plasticized hose forming mass. This bore 13 of bushing 11 is closed towards the rear end of such bushing, and this can be accomplished, for instance, through the provision of a suitable closure plug 14. The plug 14 can be designed as an expandable plug element and by tightening from the rear a screw 15 plug member 14 can be fixed in the desired position.

Continuing, it will be observed that internally of the bore 13 of the sleeve or bushing 11 there is arranged a mandrel 16. This mandrel 16 is provided with laterally extending vanes or wings 16', 16", of which at least 3 are advantageously provided, and these vanes serve to guide the mandrel within the bore 13. Further, it will be seen that a portion of the mandrel 16 extends into or through the bore 4 provided at the injection or extrusion disk 3. The rear end of this mandrel 16 is threadably connected in the bushing 11 or at the plug member 14, as shown.

Finally, in the annular space or gap 17 which is formed between the outer wall of the bushing 11 and the bounding wall of the bore of the housing 1 or that of the distributor head 6 there is arranged a guide element 18. Guide element 18 may, for instance, possess the form of a spiral 18' as shown in FIG. 3 or may be in the form of a disk 18" having guide slots 19, as shown in the arrangement of FIG. 4. In either case and in any event this guide element 18 serves the purpose of guiding the reinforcement material introduced into the injection head device in a given spatial orientation or position out of the annular or ring-shaped gap 20 between the front end of the distributor head 6 and the bushing 11 into the annular or ring-shaped compartment 21 between the mandrel 16 and the injection disk 3.

The compartment or chamber 8 as well as the second compartment or chamber 13' formed by the bore of the bushing 11 each possess a substantially ring-shaped outlet or discharge opening 22 and 23, respectively, these openings 22, 23 being disposed approximately concentrically with regard to one another in the same plane and are arranged directly in front of the inlet to the injection or extrusion opening defined by the annular or ring shaped compartment 21. The outlet or discharge 24 for the reinforcement material is located concentrically between the outlet or discharge openings 22 and 23 discussed above.

During operation of the inventive injection head device described above reinforcement material is now conducted into the injection head, for instance from the rear thereof in the direction of the arrow A and through the housing bore 2, and at the guide element 18 this reinforcement material is placed into the desired spatial orientation, and then transferred via the outlet or discharge 24 into the injection opening 21. On the other hand, plasticized hose building material is introduced through the agency of the inlet 10, the channels 9 and 13 into the compartments 8 and 13', respectively, and from that location through the discharge or outlet openings 22 and 23 likewise into the injection or extrusion opening 21. At the actual hose forming location, that is to say at the entrance to the injection or extrusion opening 21 plasticized hose forming material is now simultaneously injected from the inside and the outside against or, as the case may be, through the reinforcement material. The entire unit, consisting of the reinforcement material and the hose forming mass, is then calibrated at the injection opening and continuously withdrawn.

As already indicated above, depending upon the selection of the guide element 18, it is possible to place the reinforcement material in different spatial arrangement at the hose wall. For instance, by means of the spiral construction 18' of FIG. 3, it is possible to deliver from the rear, for instance, a coarse-meshed fabric band of a certain width and to form such at the spiral 18', for instance into two or more coils or windings. A hose member reinforced with a spiral- or helically-wound reinforcement material of this type is particularly suitable for taking up loads due to tension as well as due to transverse applied forces. Now, with the guide element shown in the modified version of FIG. 4, it is possible to arrange a number of reinforcement bands, for instance possessing a helically-shaped or curved configuration, at the hose element so that viewed in radial direction such bands mutually overlap one another within the wall of the hose.

FIG. 2 illustrates a further embodiment of injection head device which differs from that shown in FIG. 1 and wherein here the distributor head 6 and the inner sleeve or bushing 11 are not secured to the housing member 1 itself, rather at a further bushing or sleeve 25. This further bushing 25 is located within the housing 1 and at least at the rear conical housing bore 2 is locked blocked in position by means of a fixing screw 26 or other suitable equivalent device. The compartment 8 is in flow communication with the inlet 10 through the agency of troughs or depressions, which have not been particularly shown herein, and provided at the outside surface of the bushing 25. The compartment 13' of the bore 13 of the inner bushing 11 is in flow communication with the inlet 10 by means of a transverse bore 27 provided at the bushing 25. With the embodiment of injection head device as shown in FIG. 2, the inner bushing 11 is fixedly secured in desired position within the lengthwise bore 25' of the second bushing 25 by means of screws 28, 29 and 30, which, as shown, threadably engage with a local thickened or enlarged section 11' of the inner bushing 11.

Of course, all of the important elements of the injection head can be exchanged such as, for instance, the guide element 18 and also the mandrel 16 and the injection or extrusion disk 3 which together with the mandrel 16 form the actual injection or extrusion die.

While there is shown and described present preferred embodiments of the invention, it is to be distinctly understood that the invention is not limited thereto but may be otherwise variously embodied and practiced within the scope of the following claims.

What is claimed is:

1. An extrusion head arrangement for manufacturing hoses formed of rubber or other plastic masses and containing pre-formed, solid reinforcement inserts, comprising an extrusion head housing, means providing an inlet for plasticized hose forming material at said housing, said housing being provided with means defining a pair of compartments in communication with said inlet, an extrusion opening arranged at the outlet side of said housing, an outlet provided for each of said compartments, each said outlet possessing a substantially ring-shaped outlet opening, said outlet openings being located concentrically with respect to one another in front of the inlet to said extrusion opening, discharge means opening into said openings of the compartments, and guide means within said housing for reinforcement material introduced into the housing in order to guide such pre-formed, solid reinforcement material in a predetermined spatial arrangement out of an annular gap defining said discharge means into said extrusion opening, said extrusion head arrangement being adapted to simultaneously and separately inject plasticized material from each of said outlet openings against both the inside and outside of said pre-formed, solid reinforcement material to thereby form said hoses.

2. The extrusion head arrangement as defined in claim 1, wherein said housing possesses a lengthwise bore, said extrusion die embodying an extrusion disk possessing said extrusion opening, said extrusion disk being mounted at the outlet side of the bore of the housing, said means defining a pair of compartments including a distributor head possessing a continuous bore arranged at the outlet side of the housing bore, said distributor head, said extrusion disk and said housing bore cooperating with one another to form a compartment opening in ring-shaped fashion into the extrusion opening and defining one of said pairs of compartments, said last-mentioned compartment communicating with said inlet provided at the housing for the plasticized hose forming material, an inner bushing mounted in the bore of the housing at a spacing from the walls of such housing bore, said bushing having a front section extending through said distributor head, said bushing having a bore defining the second of said pair of compartments, means for closing the rear end of such bushing bore, said bushing having a bore defining the second of said pair of compartments, means for closing the rear end of such bushing bore, said bushing bore being in flow communication with said inlet for the hose forming material, said extrusion die further embodying a mandrel extending within the bore of said inner bushing and extending at least with a portion thereof through said extrusion opening, said guide means for the reinforcement material introduced into said housing being located in an annular compartment formed between the inner bushing and the housing in order to guide such material in a predetermined spatial arrangement out of an annular gap defining said discharge means and located between the front end of said distributor head and the inner bushing into a substantially ring-shaped compartment formed between the mandrel and the extrusion disk.

3. The extrusion head arrangement as defined in claim 2, wherein said inner bushing is mounted in such fashion in said lengthwise bore of said housing that said reinforcement material can be delivered from the rear into said annular compartment between the inner bushing and the housing.

4. The extrusion head arrangement as defined in claim 1, wherein said annular gap communicates with a delivery channel for the reinforcement material, and said guide means are arranged at said annular gap.

5. The extrusion head arrangement as defined in claim 4, wherein said guide means is exchangeably mounted.

6. The extrusion head arrangement as defined in claim 1, wherein said guide means comprises a spirally configured element in order to deliver the reinforcement material in spiral configuration into the extrusion opening.

7. The extrusion head arrangement as defined in claim 1, wherein said guide means comprises a disk with guide slots for a number of bands of reinforcement material.

8. The extrusion head arrangement as defined in claim 1, wherein said outlets of the compartments are concentrically arranged about the axis of the extrusion die and open conically from the inside and the outside towards the outlet side in front of the inlet to the extrusion opening.

9. The extrusion head arrangement as defined in claim 1, wherein said housing has a continuous bore and said means providing said inlet comprising at least a lateral inlet for the hose forming material, said extrusion die embodying an extrusion disk with said extrusion opening and mounted at the outlet side of the housing bore, a first bushing arranged within the housing bore, said first bushing having a front end forming a distributor head and at least extending up to the region of the extrusion opening, a compartment defining one of said pairs of compartments formed between the distributor head and the wall of the housing bore and communicating with said inlet for the hose forming material, a second bushing arranged within said first bushing at a spacing from the inner wall thereof, the forward end of said second bushing extending at least up to the region of the extrusion opening and said second bushing having a bore defining the second of said pair of compartments, means for closing the rear end of said bore of said second bushing, said second bushing bore being in flow communication with said inlet for the hose forming material, said extrusion die further embodying a mandrel arranged within the bore of the second bushing and having at least a portion extending through the extrusion opening, said guide means being arranged in an annular compartment formed between the first and second bushings in order to guide material in a predetermined spatial arrangement out of an annular gap defining said discharge means and disposed between the front end of the distributor head and the second bushing into a substantially ring-shaped compartment formed between the mandrel and the injection disk.

* * * * *